(12) United States Patent
Shigetomi et al.

(10) Patent No.: US 6,393,400 B1
(45) Date of Patent: *May 21, 2002

(54) INTELLIGENT OPTICAL DISK WITH SPEECH SYNTHESIZING CAPABILITIES

(75) Inventors: Takashi Shigetomi; Tetsuo Saito, both of Miyagi-ken; Tsunematsu Komaki, Tokyo, all of (JP)

(73) Assignee: Kabushiki Kaisha Optrom, Miyagi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 25 days.

(21) Appl. No.: 09/155,686
(22) PCT Filed: Jun. 18, 1998
(86) PCT No.: PCT/JP98/02699
  § 371 Date: Oct. 2, 1998
  § 102(e) Date: Oct. 2, 1998
(87) PCT Pub. No.: WO98/58365
  PCT Pub. Date: Dec. 23, 1998

(30) Foreign Application Priority Data

Jun. 18, 1997 (JP) .............................. 9-161664

(51) Int. Cl.[7] .............................................. G10L 13/00
(52) U.S. Cl. ........................................ 704/258; 704/270
(58) Field of Search ................................ 704/258, 270, 704/278; 386/125

(56) References Cited

U.S. PATENT DOCUMENTS

| 4,338,644 A | 7/1982 | Staar ........................... 360/132 |
| 4,814,924 A | 3/1989 | Ozeki .......................... 360/133 |
| 4,839,875 A | 6/1989 | Kuriyama et al. ............. 369/14 |
| 4,868,373 A | 9/1989 | Opheij et al. ................. 235/280 |
| 4,960,982 A | 10/1990 | Takahira ...................... 235/382 |
| 5,036,461 A | 7/1991 | Elliott et al. ................. 364/408 |
| 5,119,353 A | 6/1992 | Asakura ....................... 369/13 |

(List continued on next page.)

FOREIGN PATENT DOCUMENTS

| DE | 196 07 169 | 11/1996 |
| EP | 0 190 733 | 8/1986 |
| EP | 0 193 635 | 9/1986 |
| EP | 0 394 098 | 10/1990 |
| EP | 0 545 532 | 6/1993 |
| EP | 0 662 674 | 7/1995 |
| EP | 0 756 274 | 1/1997 |
| EP | 0 809 245 | 11/1997 |

(List continued on next page.)

OTHER PUBLICATIONS

"Magnetic Recording Disk With Silicon Substrate Disk Containing Both Integrated Electronic Circuits and Magnetic Media" IBM Technical Disclosure Bulletin, vol. 28, No. 7, Dec. 1985, pp. 2861–2862, XP002073271 New York, US.

Primary Examiner—David R. Hudspeth
Assistant Examiner—Susan Wieland
(74) Attorney, Agent, or Firm—Merchant & Gould P.C.

(57) ABSTRACT

The present invention provides a speech-synthesizing apparatus that synthesizes various types of voices and words, such as a dialect, on the basis of more compact databases, and a storage medium that has an electronic circuit making the speech-synthesizing apparatus feasible. The storage medium is an intelligent disk having part for storing information and part of an electronic circuit for processing the information. The disk stores at least parameters for controlling speech synthesis in an external apparatus or information to be speech-synthesized and a voice database that are used in the speech synthesis. The electronic circuit part selects the parameters corresponding to information to be speech-synthesized.

13 Claims, 7 Drawing Sheets

U.S. PATENT DOCUMENTS

| | | | |
|---|---|---|---|
| 5,159,182 A | 10/1992 | Eisele | 235/492 |
| 5,235,586 A | 8/1993 | Feamster et al. | 369/100 |
| 5,276,572 A | 1/1994 | Kinoshita et al. | 360/97.01 |
| 5,289,521 A * | 2/1994 | Coleman et al. | 379/52 |
| 5,423,054 A | 6/1995 | Schmidt et al. | 395/800 |
| 5,533,125 A | 7/1996 | Bensimon et al. | 380/4 |
| 5,546,585 A | 8/1996 | Soga | 395/700 |
| 5,559,958 A * | 9/1996 | Farrand et al. | 395/183.03 |
| 5,584,043 A | 12/1996 | Burkart | 395/882 |
| 5,634,111 A | 5/1997 | Oeda et al. | 395/480 |
| 5,652,838 A | 7/1997 | Lovett et al. | 395/186 |
| 5,663,553 A | 9/1997 | Aucsmith | 235/492 |
| 5,734,787 A | 3/1998 | Yonemitsu et al. | 386/111 |
| 5,737,549 A * | 4/1998 | Hersch et al. | 395/309 |
| RE35,839 E | 7/1998 | Asai et al. | 380/3 |
| 5,793,714 A | 8/1998 | Inoue et al. | 369/30 |
| 5,802,519 A | 9/1998 | De Jong | 707/100 |
| 5,844,218 A | 12/1998 | Kawan et al. | 235/380 |
| 5,856,659 A | 1/1999 | Drupsteen et al. | 235/380 |
| 5,857,079 A | 1/1999 | Claus et al. | 704/233 |
| 5,878,282 A | 3/1999 | Mital | 395/882 |
| 5,889,657 A | 3/1999 | Kono | 361/773 |
| 5,890,014 A | 3/1999 | Long | 395/828 |
| 5,903,867 A * | 5/1999 | Watari et al. | 704/270 |
| 5,920,733 A | 7/1999 | Rao | 395/888 |
| 5,930,823 A | 7/1999 | Ito et al. | 711/152 |
| 5,936,226 A | 8/1999 | Aucsmith | 235/492 |
| 5,940,363 A | 8/1999 | Ro et al. | 369/273 |
| 5,951,687 A | 9/1999 | Chan et al. | 713/2 |
| 5,999,698 A * | 12/1999 | Nakai et al. | 386/125 |
| 6,005,940 A | 12/1999 | Kulinets | 380/21 |
| 6,021,306 A * | 2/2000 | McTaggart | 434/317 |
| 6,029,887 A | 2/2000 | Furuhashi et al. | 235/379 |
| 6,044,046 A | 3/2000 | Diezmann et al. | 369/14 |

FOREIGN PATENT DOCUMENTS

| | | |
|---|---|---|
| JP | 61-286927 | 12/1986 |
| JP | 63-7541 | 1/1988 |
| JP | 63-217569 | 9/1988 |
| JP | 1-127392 | 5/1989 |
| JP | 1-162286 | 6/1989 |
| JP | 1-263892 | 10/1989 |
| JP | 2-5158 | 1/1990 |
| JP | 4-304011 | 10/1992 |
| JP | 4-355818 | 12/1992 |
| JP | 4-356785 | 12/1992 |
| JP | 5-258347 | 10/1993 |
| JP | 5-282771 | 10/1993 |
| JP | 6-36305 | 5/1994 |
| JP | 6-295200 | 10/1994 |
| JP | 8-123635 | 5/1996 |
| JP | 8-161790 | 6/1996 |
| JP | 9-34491 | 2/1997 |
| TW | 289190 | 10/1996 |
| TW | 374913 | 11/1999 |
| WO | 96/29699 | 9/1996 |

OTHER PUBLICATIONS

IBM Journal TDB, Jun. 1992, pp. 311–314.
Patent Abstract of Japan vol. 012, No. 140 (P–696), Apr. 28, 1988 for JP 62–262289A, Nov. 14, 1987.
Patent Abstract of Japan vol. 097, No. 005, May 30, 1997 & JP 09–017154A, Jan. 17, 1997.
Patent Abstract of Japan (JPA 09–245381).
Patent Abstract of Japan vol. 033 (P–334), Feb. 13, 1985 & JP59–175062A, Oct. 3, 1984.
International Search Report in Japanese for application PCT/JP98/02699, dated Sep. 29, 1998.

* cited by examiner

INTELLIGENT OPTICAL DISK WITH SPEECH SYNTHESIZING CAPABILITIES

DESCRIPTION

1. Technical Field

The present invention relates to a storage medium having an information storage block storing information and an electronic circuit block processing information, for example, an electronic-circuit mounting optical disk (hereinafter, this is called an intelligent disk (ID)), and to a speech-synthesizing apparatus synthesizing speech on the basis of information stored in the storage medium and controlled by the electronic circuit block.

2. Background Art

Conventional speech-synthesizing apparatus play back speech by connecting sounds from a machine-word database storing phonemes in waveforms and a sound source database storing sounds extracted from the corrected sounds. Recently, since the study of the sound source database has proceeded, it becomes possible to reproduce sounds made to imitate the voice of a specific person.

Nevertheless, it becomes necessary to prepare various types of sound sources depending on states of connecting sounds even in order to generate the same sound so as to play back a more characteristic voice. Therefore, it becomes necessary to have huge amounts of data, and hence the present approach is only used for demonstration and not put to practical use.

DISCLOSURE OF INVENTION

The present invention provides a speech-synthesizing apparatus that resolves conventional defects, described above, and synthesizes various types of words and voices, such as a dialect, on the basis of more compact databases, and a storage medium that has an electronic circuit making the speech-synthesizing apparatus feasible. Furthermore, the present invention also provides a computer system including the above-described speech-synthesizing apparatus, for example, a car navigation system and the like.

In order to solve this task, the storage medium of the present invention has an information storage block storing information and an electronic circuit block for processing information. Furthermore, the medium is characterized in that the information storage block stores at least parameters for controlling speech synthesis in an external apparatus, and the electronic circuit block has means for selecting the parameters corresponding to information to be speech-synthesized. Here, the information storage block further stores the information to be speech-synthesized. In addition, the information storage block further stores a voice database to be used in speech synthesis. Furthermore, the storage medium is an optical disk.

In addition, a speech-synthesizing apparatus of the present invention includes a storage medium having an information storage block for storing information and an electronic circuit block for processing information. The apparatus is characterized in that the information storage block of the storage medium stores at least parameters for controlling speech synthesis in an external apparatus, and the electronic circuit block has means for selecting the parameters corresponding to information to be speech-synthesized. Here, the information storage block further stores the information to be speech-synthesized. In addition, the information storage block further stores a voice database to be used in speech synthesis.

A speech-synthesizing apparatus of the present invention is characterized in comprising discriminating means for judging whether or not a storage medium having an information storage block storing information and an electronic circuit block processing information is inserted, and speech synthesizing means for synthesizing speech by using the storage medium at the time when the storage medium is inserted and for synthesizing speech without using the storage medium at the time when the storage medium is not inserted. The storage medium is an optical disk.

In addition, a computer system of the present invention includes a speech-synthesizing apparatus. Furthermore, the computer system is characterized in that the speech-synthesizing apparatus includes a storage medium having an information storage block for storing information and an electronic circuit block for processing information. Furthermore, the system is characterized in that the information storage block of the storage medium stores at least parameters for controlling speech synthesis in an external apparatus, and the electronic circuit block of the storage medium has means for selecting the parameters corresponding to information to be speech-synthesized. The storage medium is an optical disk.

In addition, a car navigation system of the present invention includes a speech-synthesizing apparatus. Furthermore, the car navigation system is characterized in that the speech-synthesizing apparatus includes a storage medium having an information storage block for storing information and an electronic circuit block for processing information. Furthermore, the car navigation system is characterized in that the information storage block of the storage medium stores at least parameters for controlling speech synthesis in an external apparatus, and the electronic circuit block of the storage medium has means for selecting the parameters corresponding to information to be speech-synthesized. The storage medium is an optical disk.

The present invention can provide a speech-synthesizing apparatus for synthesizing various types of voices, such as a dialect, and words, on the basis of more compact databases, and a storage medium that has an electronic circuit making the speech-synthesizing apparatus feasible. Furthermore, the present invention also provides a computer system, including the speech-synthesizing apparatus, such as a car navigation system.

BEST MODE FOR CARRYING OUT THE INVENTION

For more detailed description of the present invention, embodiments of the present invention will be described with reference to attached drawings.

(A Constructive Example of a Speech-synthesizing Apparatus of this Embodiment)

Figure 1:
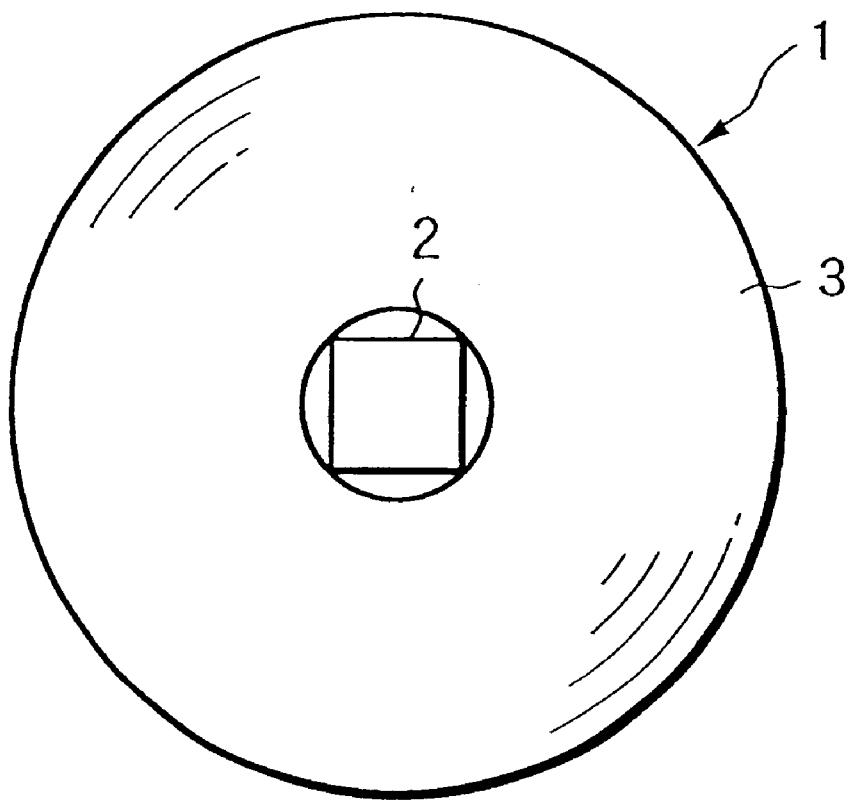
FIG. 1 is a sketch of an intelligent optical disk that is a kind of an ID of this embodiment.

FIG. 1 is a sketch of an intelligent optical disk, that is a kind of an ID of this embodiment. The ID 1 comprises a disk block 3 that is a disk surface storing information, and an intelligent circuit block 2 that is mounted, for example, in the central portion of the disk block 3 as shown in FIG. 1. Here, although the circuit block 2 is located in the central portion of the disk, the location is not particularly limited, for example, it can also be located on a dedicated side of the disk surfaces or in a middle layer of a disk manufactured in plural layers.

Figure 2:
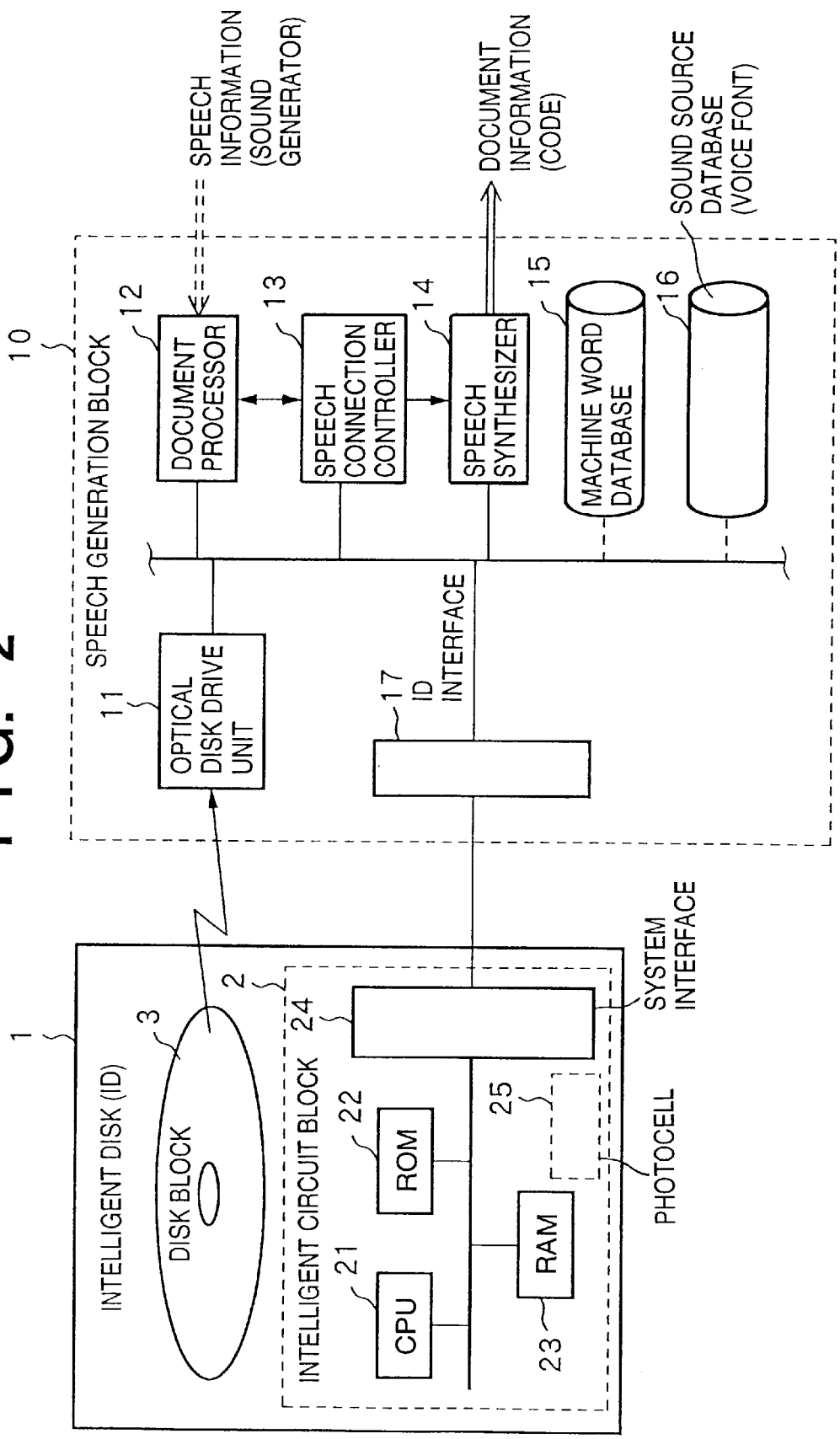
FIG. 2 is a block diagram showing the construction of a speech-synthesizing apparatus of this embodiment.

FIG. 2 is a block diagram showing the construction of a speech-synthesizing apparatus of this embodiment. Numeral 10 shows a speech generation block that has a document processor 12 generating information for speech synthesis from document information (code) inputted, a speech synthesizer 14 synthesizing and outputting speech corresponding to an output of the document processor 12 on the basis of a machine word database and a sound source database (hereinafter, this is also called a voice font), and a speech connection controller 13 controlling the document processor 12 and speech synthesizer 14. The speech connection controller 13 receives speech connection information and document connection information that are read from the disk block 3 of the ID 1, and instructs the document processor to sort, insert, and delete words. Furthermore, the controller 13 instructs the speech synthesizer 14 in sound lengths, addition/omission of phonemes, accents, high/low pitches, weak/strong voices, and the like.

The machine-word database 15 and sound source database 16 are connected to the bus in dotted lines to show that these databases can be stored in the disk block of the ID 1.

The speech generation block 10 further has an optical disk drive unit 11 including a pickup (not shown) and a pickup drive circuit for the ID 1, and an ID interface 17 receiving information from the intelligent circuit block 2 of the ID 1. It is not necessary for these components to be included in the speech-generating block 10. Hence, they can be included in another functional block, the speech-generating block 10 is built in a computer system and the like, as described later. Furthermore, although the destination of the speech information is not shown, a speaker, an earphone, or the like is connected as a sound generator.

The ID 1 comprises the disk block 3 and intelligent circuit block 2. The intelligent circuit block 2 has a CPU 21 for calculation and control that controls readout of data from the disk block 3. A ROM 22 for storing fixed programs and parameters for the CPU 21, a RAM 23 for temporary storage, and a system interface 24 for information exchange with the system. Furthermore, in case the ID 1 has an independent power source, a photocell 25 is also included. Moreover, the interface can be a contact type or a non-contact type, and a bus-connection type or a communication-connection type. Radio communication, optical communication, and the like are conceivable as the communication means. Nevertheless, since an external apparatus 10 of this application is not intended to be made by large-scale modification of an existing apparatus, a simple method for adding the ID 1 to the existing apparatus can be chosen.

(Example of a Stand-alone Type of Speech-synthesizing Apparatus)

On the basis of FIGS. 3 to 5, examples of storage construction and processing procedure of information in an independent speech-synthesizing apparatus such as a tape recorder and a voice book that is a talking book will be described.

Figure 3:
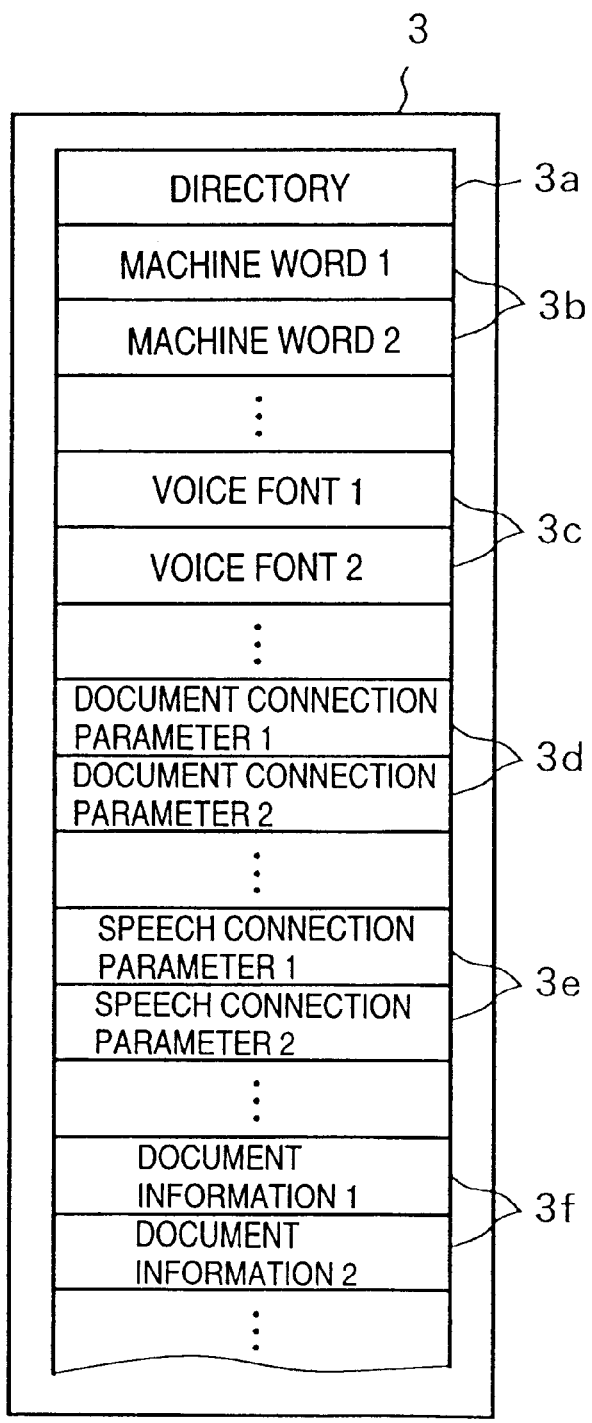
FIG. 3 is a drawing showing an example exemplifying the stored contents of a disk block 3 of this embodiment.

FIG. 3 is an example of the construction of information stored in the disk block 3.

In destinations pointed by a directory 3*a*, the following information is stored. Numeral 3*b* shows the machine word database, which has a plurality of different databases in the drawing. Numeral 3*c* shows voice fonts, and a plurality of fonts is stored. Numeral 3*d* shows document connection parameters to be used for control of the document processor 12 by the speech connection controller 13, and plural kinds of parameters are also stored. Numeral 3*e* shows speech connection parameters to be used for control of the speech synthesizer 14 by the speech connection controller 13, and plural kinds of speech connection parameters are also stored. In some cases, only one of this information 3*b* to 3*e* can be sufficient so long as the document information is output with the same characteristics (for example, a person's reading). The difference of those parameters is separated so as to correspond to the difference of the document information as shown below in detail.

In FIG. 3, numeral 3*f* shows document information. Document information can be information having a length of the entire novel read by an actor/actress or information having a length of each dialogue in a drama.

Figure 4:
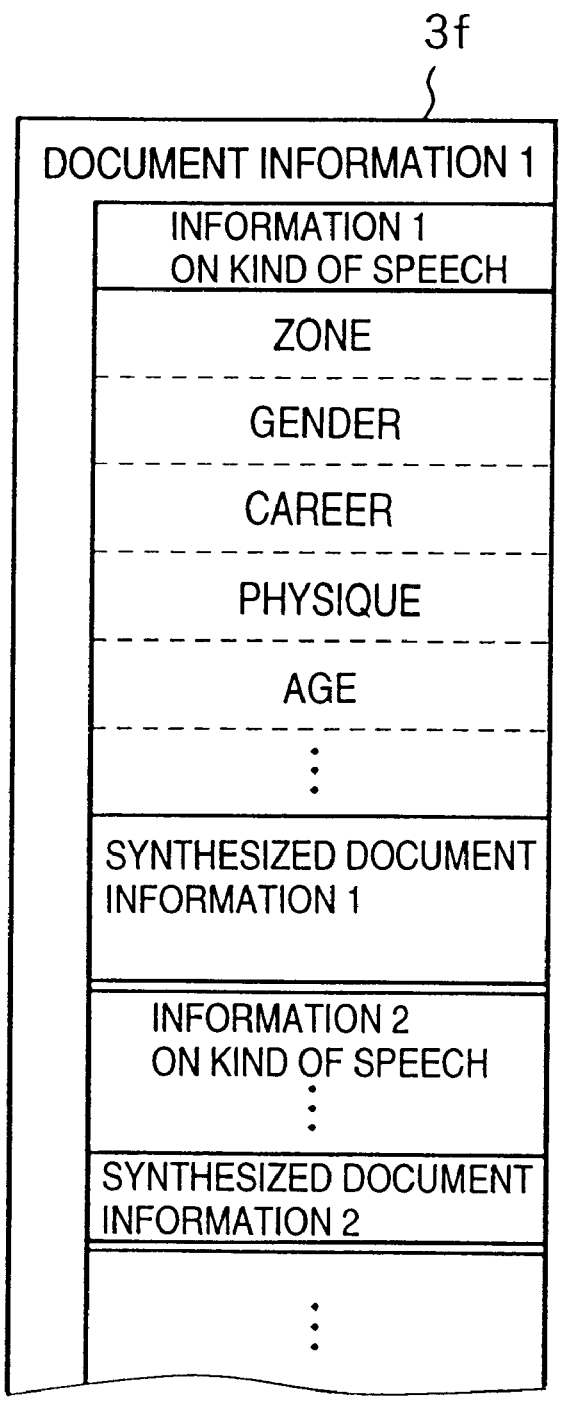
FIG. 4 is a drawing showing a constructive example of document information of this embodiment.

FIG. 4 is a drawing showing the internal structure of the document information 3*f*.

Document information 1 comprises a pair of kinds of speech information and document information to be synthesized, or plural pairs of them. What is conceivable as kind of speech information is a plurality of indices showing the characteristics for synthesizing sentences of the synthesized document information, for example, a zone (relating to a language in the world or a dialect of a country), gender, career, physique, age, and the like. In addition, if combinations of these indices corresponding to keywords showing some famous persons or contents of some documents are stored, a specific voice can be simply selected. The document information is a document (code) to be actually synthesized.

Figure 5:
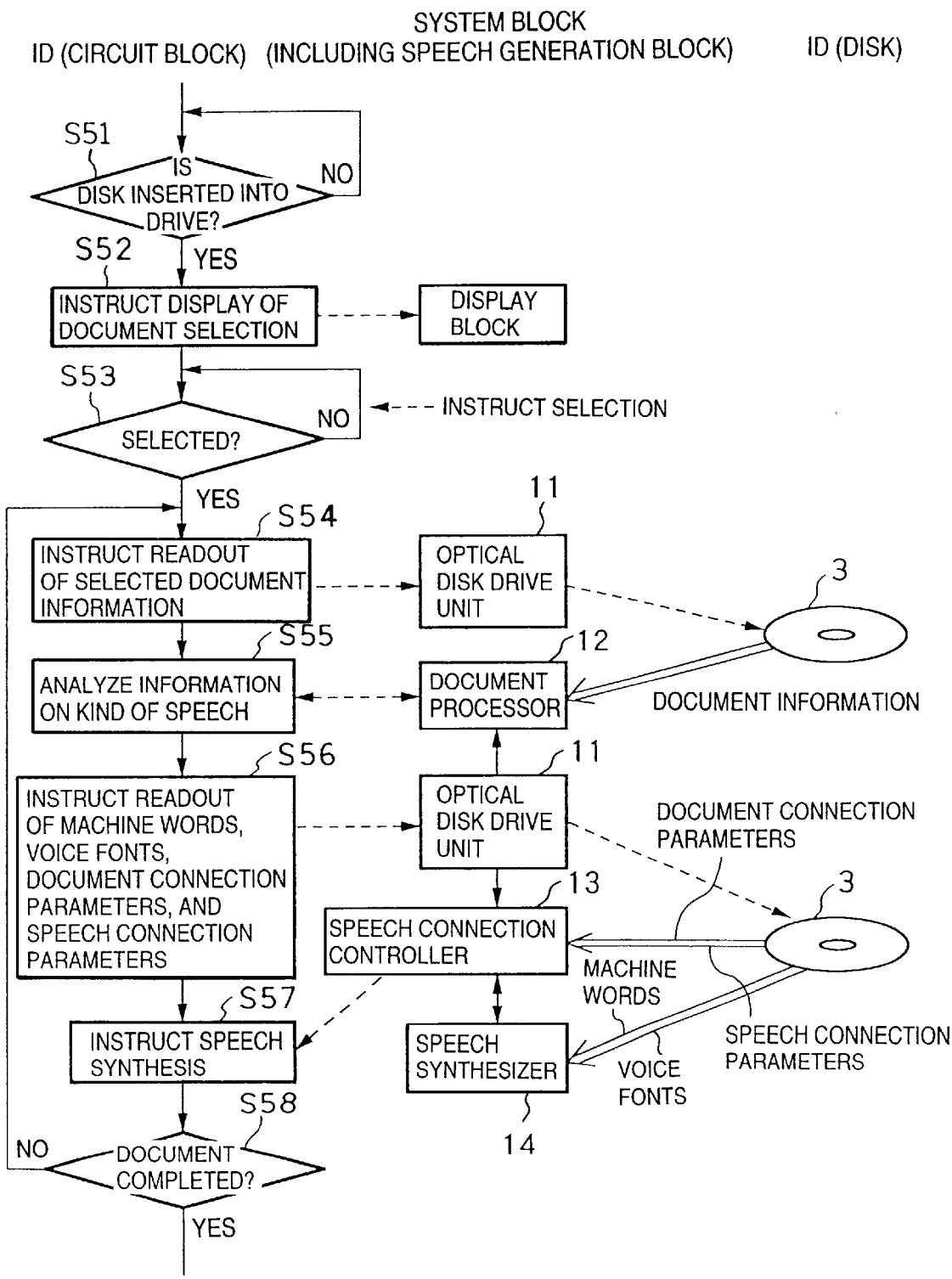
FIG. 5 is a chart showing an operation-procedural example of a stand-alone type of speech-synthesizing apparatus.

FIG. 5 is a flow chart showing how this speech-synthesizing apparatus generates speech by using information in FIGS. 3 and 4. The CPU 21 of the circuit block 2 in the ID 1 checks at step S51 whether or not the ID 1 is inserted into a drive. If inserted, the process goes to step S52. If there is a plurality of documents, the CPU 21 instructs the system side to display document selection, and a system display unit (not shown) displays it. A selection command, from a user, is waited at step S53, and if received, the process goes from step S53 to step S54. In addition, if there is only one document, steps S52 and S53 can be omitted.

At step S54, the CPU 21 instructs the optical disk drive unit 11, with an address, to read the document information selected. The optical disk drive unit 11 reads, at the instructed address, the document information selected, and stores the information into a buffer in the document processor 12. At step S55, the CPU 21 separates the kind of speech information from the leading portion of the document information, which is in the document processor 12 or is directly transferred from the optical disk drive unit 11, and analyses this information.

Next, at step S56, using the analysis result, the CPU 21 instructs the optical disk drive unit 11, again, to read machine-words, voice fonts, document connection parameters, and speech connection parameters that are to be used. In regard to the information read from the disk block 3 by the optical disk drive unit 11, the machine words and voice fonts are set in the speech synthesizer 14, and the parameters are set in the speech connection controller 13.

At step S57, the CPU 21 instructs the speech connection controller 13 to perform the speech synthesis. The speech connection controller 13 performs exchange, insertion, deletion, and the like of words by controlling the document processor 12 according to the document connection parameters, and connects the machine-words and voice fonts according to the speech connection parameters by using the speech synthesizer 14.

At step S58, whether or not all of the document outputs desir ed are complete is checked, and if not completed, the process returns to step S54 and repeats steps S54 to S58.

(Example of a Speech-synthesizing Apparatus Built in a Computer System)

According to FIG. 4 described above, an example of a speech-synthesizing apparatus built in a system will be described with reference to FIGS. 6 and 7. In this case, the machine word database 15 and voice font database 16 are prepared in the system side in FIG. 2, and document information (code) is inputted by another component included in the system to the speech generation block 10.

Figure 6:
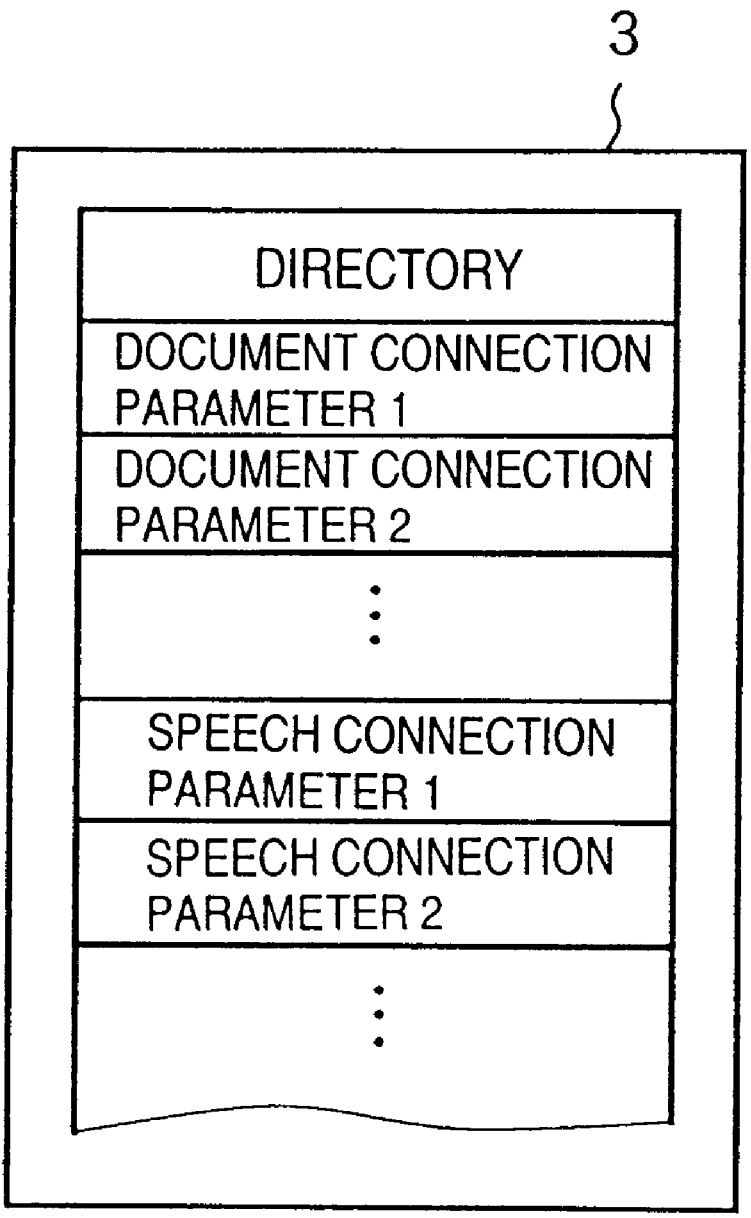
FIG. 6 is a drawing showing another example exemplifying the stored contents of the disk block 3 of this embodiment.
Figure 7:
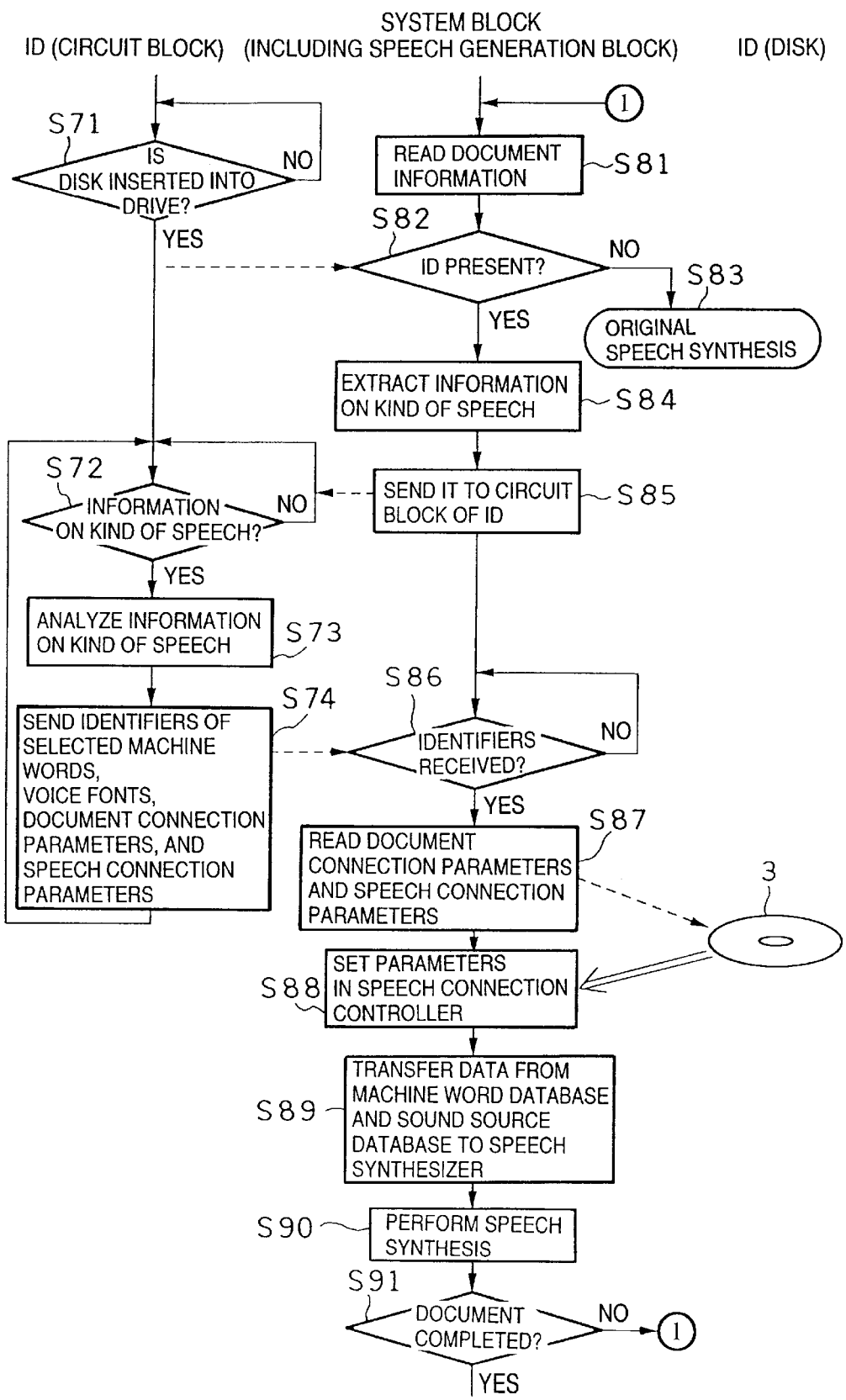
FIG. 7 is a chart showing an example of a speech-synthesizing apparatus built in a system.

FIG. 6 is a drawing showing the contents stored in the disk block 3 of the ID 1. In the case of this example, only document connection parameters and speech connection parameters are stored. In this example, it is possible to control the speech synthesis more delicately since these parameters can be prepared by classifying them in detail with particular correspondence to the contents to be played back. According to FIG. 7, an example of a procedure for speech synthesis of this application will be described. In the case of this example, the circuit block 2 of the ID 1 collaborates with a system controller (not shown) controlling the speech generation block 10.

First, a CPU (not shown) in the system side reads document information from another component at step S81. At step S82, whether an ID is inserted is checked, and if not inserted, the process goes to step S83 for the system to synthesize speech only by the speech generation block 10 of a system block without using parameters held by the ID 1. In this stage, it is natural for the delicate control for synthesizing speech not to be performed.

Now, if the ID 1 is inserted into the optical disk drive unit 11, the process goes from step S82 to step S84 in the system side for the system to separate the kind of speech information shown in FIG. 4 from the document information and send it to the ID 1 at step S85.

In the ID side, if it is confirmed that the ID 1 is inserted into the drive at step S71, the kind of speech information from the system side is waited at step S72. If the kind of speech information is received, the process goes to step S73 for the ID 1 to generate identifiers of machine-words, voice fonts, document connection parameters, and speech connection parameters and return them to the system side at step S74.

In the system side, if the system receives the identifiers at step S86, the system reads parameters from the disk block 3 at step S87 to set the parameters in speech connection controller 13 at step S88. Subsequently, at step S89, the system transfers the machine-words and voice fonts, which are select ed by using the identifiers, from the databases 15 and 16 to the speech synthesizer 14. At step S90, speech information is outputted according to the control of the speech connection controller 13 similarly to the case of the stand-alone type of speech-synthesizing apparatus.

At step S91, the completion of the document is checked, and if not completed, the process returns to step S81 to continue processing of document information. In addition, in the above two examples, two extreme examples are described, which are the example where speech is synthesized mainly by the ID since the ID has all the in formation for document synthesis, and the example that the system side can also perform the speech synthesis independently without using the ID since the ID has only the parameter s. Nevertheless, obviously, various types of "medium" systems between these two systems are feasible, the "medium" system can be produced by changing combination and function assignment. For example, a system where the ID has the synthesized document information and parameters and the system side can modify the kind of speech information and a system where the ID side extracts the kind of speech information from the document information in FIG. 7 (S84) can be produced.

In addition, as a computer system that this speech-synthesizing apparatus is built in, in particular, a personal computer and a car navigation system are conceivable.

Hereinbefore, the present invention is described by preferred embodiments. Nevertheless, the present invention is not limited to the above-described embodiments and various changes, additions, and modifications can be made within the spirits and scope as set out in the accompanying claims.

What is claimed is:

1. A storage medium comprising:
    a pair of layers,
    wherein one of the pair of layers has an optically recordable or recorded surface and is used as an information recording portion for recording information, and another of the pair of layers has no optically recordable or recorded surface and is used as an electronic circuit portion where electronic circuits are included, and
    wherein said information recording portion stores at least parameters for controlling speech synthesis in an external apparatus, and
    said electronic circuit portion includes means for selecting parameters corresponding to information to be speech-synthesized and for transmitting information for reading out the selected parameters from said information recording portion to the external apparatus.

2. The storage medium according to claim 1, wherein said information storage part further stores said information to be speech-synthesized.

3. The storage medium according to claim 1, wherein said information storage part further stores a voice database to be used in speech synthesis.

4. The storage medium according to claim 1, wherein said storage medium is an optical disk.

5. A speech-synthesizing apparatus comprising a storage medium which includes:
    a pair of layers,
    wherein one of the pair of layers has an optically recordable or recorded surface and is used as an information recording portion for recording information, and another of the pair of layers has no optically recordable or recorded surface and is used as an electronic circuit portion where electronic circuits are included, and
    wherein said information recording portion stores at least parameters for controlling speech synthesis, and
    said electronic circuit portion includes means for selecting parameters corresponding to information to be speech-synthesized and for outputting information for reading out the selected parameters from said information recording portion.

6. The speech-synthesizing apparatus according to claim 5, wherein said information storage part further stores said information to be speech-synthesized.

7. The speech-synthesizing apparatus according to claim 5, wherein said information storage part further stores a voice database to be used in speech synthesis.

8. A speech-synthesizing apparatus comprising:

a storage medium having a pair of layers, wherein one of the pair of layers is used as an information recording portion for recording at least parameters for controlling speech synthesis, and another of the pair of layers is used as an electronic circuit portion including means for selecting parameters corresponding to information to be speech-synthesized;

discriminating means for judging whether said storage medium is inserted in the speech-synthesizing apparatus; and said electronic circuit portion includes means for selecting parameters corresponding to information to be speech-synthesized and for outputting information for reading out the selected parameters from said information recording portion.

9. The speech-synthesizing apparatus according to claim 8, wherein said storage medium is an optical disk.

10. A computer system comprising a speech-synthesizing apparatus having a storage medium which includes:

a pair of layers, wherein one of the pair of layers has an optically recordable or recorded surface and is used as an information recording portion for recording information, and another of the pair of layers has no optically recordable or recorded surface and is used as an electronic circuit portion wherein electronic circuits are included, and wherein said information recording portion of said storage medium stores; at least parameters for controlling speech synthesis; and wherein said electronic circuit portion of said storage medium has means for selecting parameters corresponding to information to be speech-synthesized and for outputting information for reading out the selected parameters from said information recording portion.

11. The computer system according to claim 10, wherein said storage medium is an optical disk.

12. A car navigation system including a speech-synthesizing apparatus, wherein said the speech-synthesizing apparatus includes a storage medium having a pair of layers, wherein one of the pair of layers has an optically recordable or recorded surface and is used as an information recording portion for recording information, and another of the pair of layers has no optically recordable or recorded surface and is used as an electronic circuit portion where electronic circuits are included, and wherein said information recording portion of said storage medium stores at least parameters for controlling speech synthesis, and wherein said electronic circuit portion of said storage medium has means for selecting parameters corresponding to information to be speech-synthesized and for outputting information for reading out the selected parameters from said information recording portion.

13. The car navigation system according to claim 12, wherein said storage medium is an optical disk.

* * * * *